(12) United States Patent
Akerblom et al.

(10) Patent No.: US 7,064,536 B2
(45) Date of Patent: Jun. 20, 2006

(54) TRANSDUCER FOR DISTANCE MEASUREMENT

(75) Inventors: Bengt Akerblom, Varby (SE); Bengt Lofqvist, Johanneshov (SE)

(73) Assignee: Daprox AB, Skarholmen (SE)

( * ) Notice: Subject to any disclaimer, the term of this patent is extended or adjusted under 35 U.S.C. 154(b) by 191 days.

(21) Appl. No.: 10/484,267

(22) PCT Filed: Sep. 24, 2002

(86) PCT No.: PCT/SE02/01734

§ 371 (c)(1),
(2), (4) Date: Jan. 20, 2004

(87) PCT Pub. No.: WO03/027607

PCT Pub. Date: Apr. 3, 2003

(65) Prior Publication Data

US 2004/0169506 A1  Sep. 2, 2004

(30) Foreign Application Priority Data

Sep. 26, 2001 (SE) .................................... 0103199

(51) Int. Cl.
*G01B 7/14* (2006.01)
*G01B 7/30* (2006.01)
*H01F 5/00* (2006.01)

(52) U.S. Cl. .................................... 324/207.15; 241/37
(58) Field of Classification Search ........... 324/207.11, 324/207.13, 207.22, 207.26, 207.15; 241/28, 241/30, 37, 259.1

See application file for complete search history.

(56) References Cited

U.S. PATENT DOCUMENTS

| 2,548,599 | A | * | 4/1951 | Garr ............................. 241/37 |
| 2,978,599 | A | * | 4/1961 | Wilcox ........................ 310/168 |
| 3,848,814 | A | * | 11/1974 | Syrjanen ....................... 241/37 |
| 4,387,339 | A | * | 6/1983 | Akerblom .............. 324/207.18 |
| 4,804,912 | A |   | 2/1989 | Lysen |
| 4,820,980 | A | * | 4/1989 | Dodson-Edgars ...... 324/207.24 |
| 5,544,819 | A | * | 8/1996 | Shepherd ..................... 241/37 |
| 5,691,636 | A | * | 11/1997 | Allshouse et al. ..... 324/207.15 |
| 6,502,774 | B1 | * | 1/2003 | Johansson et al. ............ 241/37 |
| 6,661,222 | B1 | * | 12/2003 | Twerdochlib .......... 324/207.26 |
| 6,892,973 | B1 | * | 5/2005 | Johansson et al. ....... 241/261.2 |
| 2002/0158628 | A1 | * | 10/2002 | Akerblom .............. 324/207.26 |

FOREIGN PATENT DOCUMENTS

| DE | 100 00 272 | 7/2001 |
| EP | 0 640 395 | 3/1995 |
| SE | 401 896 | 9/1976 |

* cited by examiner

*Primary Examiner*—Bot Ledynh
*Assistant Examiner*—Kenneth J. Whittington
(74) *Attorney, Agent, or Firm*—Young & Thompson

(57) ABSTRACT

A transducer (10) for distance measurement, especially between a stator and a rotor in a refiner for paper pulp production, in which the transducer is of the magnetic type and has a tubular casing (17), the one end of which forms a measuring head (14), in which a measuring pole (15) is fitted in a holder (16) which is mounted in the end of the casing (17) and seals this. The holder (16), with a first portion (22) of its axial length, reaches beyond the end of the casing. This first portion (22) and the measuring pole (15) are intended to be able to be worn away to a smaller axial length during use of the transducer, whilst the length of the casing is maintained.

11 Claims, 2 Drawing Sheets

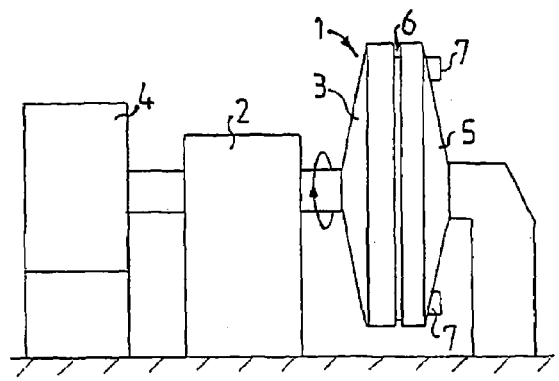
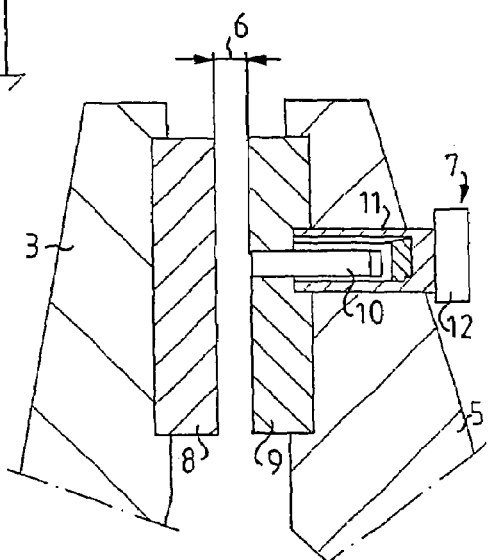
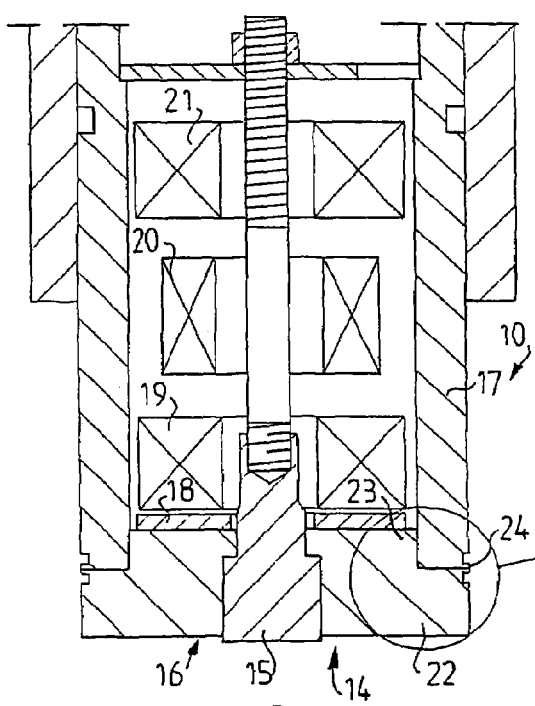
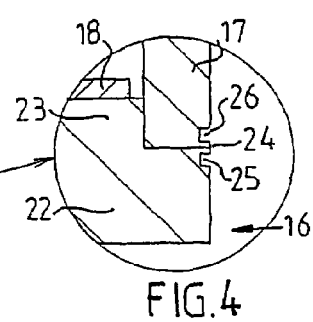
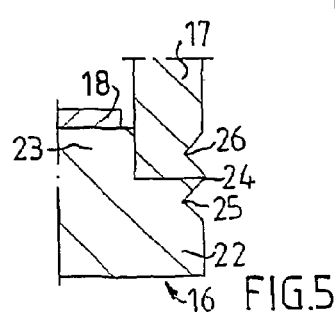

TRANSDUCER FOR DISTANCE MEASUREMENT

TECHNICAL FIELD

The present invention relates to a transducer for distance measurement, especially between a stator and a rotor in a refiner for paper pulp production, according to the preamble to Patent Claim 1.

PRIOR ART

In refiners intended for paper pulp production, the size of the beating gap between a stator and a rotor changes during operation as a result of wear and tear on the mutually facing beating segments on the stator and rotor. For quality reasons, it is desirable to have good control over the size of the beating gap and to be able to compensate for wear and tear or change the size of the beating gap for other reasons. Refiners of this type usually have long operating periods, often several months, so that the size of the beating gap should be able to be monitored during operation.

In order to be able to measure the size of the beating gap, it is known to use magnetic-type transducers which are placed in the stator, with the end surface of the measuring head on a level with the surface of the beating segments. One problem in this connection is that the measuring head becomes worn during operation. With previously used transducer designs, a spread is obtained in the read-off distance value in respect of one and the same transducer position for different degrees of wear. Consequently, different distance values are obtained, depending on the degree of wear of the measuring head.

OBJECT OF THE INVENTION

The object of the invention is to produce an improved transducer offering increased measuring accuracy in connection with wear of the transducer head. Another object is to achieve this with a simple solution.

DISCLOSURE OF THE INVENTION

The object of the invention is achieved by realizing a transducer having the characteristics as indicated in Patent Claim 1.

By realizing the holder in the transducer head in such a way that it reaches axially beyond the end of the casing, the effect is that only the holder and the actual measuring pole will become worn. Previously, when the holder was fully incorporated in the casing of the transducer, the casing also became worn.

The solution according to the invention has the effect that the measuring situation for the transducer is changed less than previously in the event of wear and tear, resulting in increased precision.

The solution according to the invention also makes it reliably easy to obtain very good sealing of the active end of the transducer by means of an external joint.

Further characteristics and advantages in respect of the solution according to the invention are evident from the description and other patent claims.

The invention will be described in greater detail below with reference to illustrative embodiments shown in the appended drawing.

DESCRIPTION OF FIGURES

In the drawing,

FIG. 1 shows a diagrammatic view of a machine provided with a transducer according to the invention, FIG. 2 shows a detail of a transducer mounting in the stator on a machine according to FIG. 1, FIG. 3 shows a section through a transducer according to the invention, FIG. 4 shows an enlarged detail in FIG. 3, FIG. 5 shows a variant of the realization in FIG. 4.

DESCRIPTION OF ILLUSTRATIVE EMBODIMENTS

Figure 6:
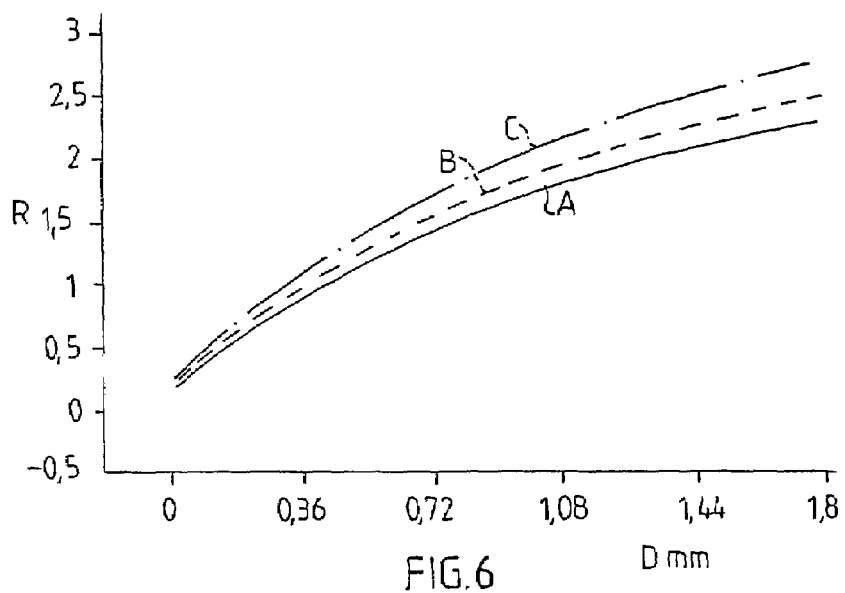
FIG. 6 shows a graph of the relationship between distance and measuring signal in respect of different transducer wear in a transducer according to the invention.

FIG. 1 shows in diagrammatic representation those parts of a refiner-type machine 1 intended for paper pulp production which are necessary to an understanding of the invention. This machine is provided with a rotor 3 mounted rotatably in a stand 2, which rotor is driven by a motor 4 and can also be axially shifted in the direction to and from a stator 5 so as to adjust the size of a beating gap 6 between the rotor 3 and the stator 5. In order to check the size of the beating gap 6, in the stator 5 there is mounted at least one transducer device 7, having a transducer which is of the magnetic type and which expediently works according to the reluctance principle. This type of transducer is well known to persons skilled in the art. Two or more transducer devices 7 can expediently be present, distributed around the stator 5.

As can be seen in greater detail from FIG. 2, both the rotor 3 and the stator 5 are provided with beating segments 8, 9, which have a surface suitable for beating paper pulp and which, in suitable number, are mounted in a ring on the rotor and stator. These beating segments 8, 9 are subjected to wear and tear during operation and are therefore expediently mounted so as to be exchangeable. In at least one of the beating segments 9, the stator 5 is provided with a transducer device 7, in which a transducer 10 is mounted in a housing 11 fixedly mounted in the stator 5, which housing, for example, can be screw-fastened in the stator. The transducer 10 is normally fixedly mounted in the housing 11, with its measuring end on a level with the associated beating segment 9, but it may instead be mounted such that it can be axially displaced by means of, for example, a roll screw with small pitch, in which a specific rotation of a control member 12 produces a specific axial displacement of the transducer 10 in either direction. The control member 12 can be constituted by, for example, a knob, but it is also possible to utilize, for example, an electric stepping motor or servo motor to be able to carry out the desired manoeuvring at a distance from the stator 5.

The gap 6 usually has a size of about 0.3–1.50 mm. Since the beating segments 8, 9 can be worn down at such a rate that a rotor shift of about 2 mm/2,000 h is necessary in order to maintain the gap size, it is clear that good measuring accuracy is desirable in order to be able, during operation, to make suitable adjustments with a view to maintaining a specific product quality.

The more detailed configuration of a transducer 10 according to the invention can be seen from FIG. 3. The transducer 10 is elongated and is formed at its one end into a measuring head 14, in which a measuring pole 15 made from magnetic material, expediently ferritic stainless steel, is centrally mounted in a holder 16 made of non-magnetic material, expediently of acid-resistant stainless steel. The holder 16 is, in turn, fastened at the end of a tubular casing 17 made of magnetic material, expediently ferritic stainless steel. Inside the casing 17 there is an insulating washer 18, bearing against the holder 16, and conventional measuring windings 19–21, which interact with the measuring pole 15 in a manner which is well known to the person skilled in the art and which requires no more detailed description in this context. For the sake of simplification, therefore, nor are descriptions given of other internal details in the transducer 10.

As can be seen from FIG. 3, the holder 16 according to the invention is configured as a plug which fits in the casing 17 and covers the end thereof. It has a first section 22, which is situated axially beyond the end of the casing 17 and whose external diameter is here essentially equal in size to the external diameter of the casing 17, but can also be larger or smaller than the external diameter of the casing 17, and a second section 23, which is situated within the casing 17 and whose external diameter is here essentially equal to the internal diameter of the casing 17, but can also be smaller than the internal diameter of the casing 17. The holder 16 is held in place in the casing 17 by means of an external, circumferential joint 24, expediently a weld joint, at the transition between the casing 17 and the first section 22 of the holder 16. A leak-tight seam or transition is thereby also obtained between the holder 16 and the casing 17.

The contacting surface on each of the two sections 22 and 23 of the holder 16 here has the form of a straight circular cylinder, but other realizations are also possible. The form can, for example, be conical on one or both contacting surfaces.

That region around the joint 24 which is marked by a dashed circle in FIG. 3 is shown on larger scale in FIG. 4. As can be seen, the first section 22 of the holder 16 accommodates a groove 25 adjacent to the end of the casing 17 and at the end of the casing 17 the casing 17 accommodates a corresponding groove 26. Both these grooves 25, 26 are U-shaped, whereby the joint 24 can easily be made relatively thin, with resultant slight heating of the holder 16 and the casing 17 during welding. An alternative realization is shown in FIG. 5, in which the grooves 25, 26 are instead V-shaped. Other realizations are also, of course, possible.

The chosen realization with a holder 16 which protrudes axially beyond the end of the casing 17 has the effect that only the measuring head 15 and the holder 16 become worn, since the transducer 10, during work, is mounted in its beating segment 9 on the stator 5, whereas the casing 17 is not subjected to wear and tear but remains intact. With this solution according to the invention, for a certain degree of wearing of the measuring head 15 a smaller error in the distance determination has been shown to be obtained than in the case of a previous solution with the holder mounted in such a way in the casing that both the holder and the casing are simultaneously subjected to wear. This allows increased precision in determining the size of the beating gap in a refiner for paper pulp production, in which wear and tear of the measuring head otherwise constitutes a problem for the measuring precision.

Figure 7:
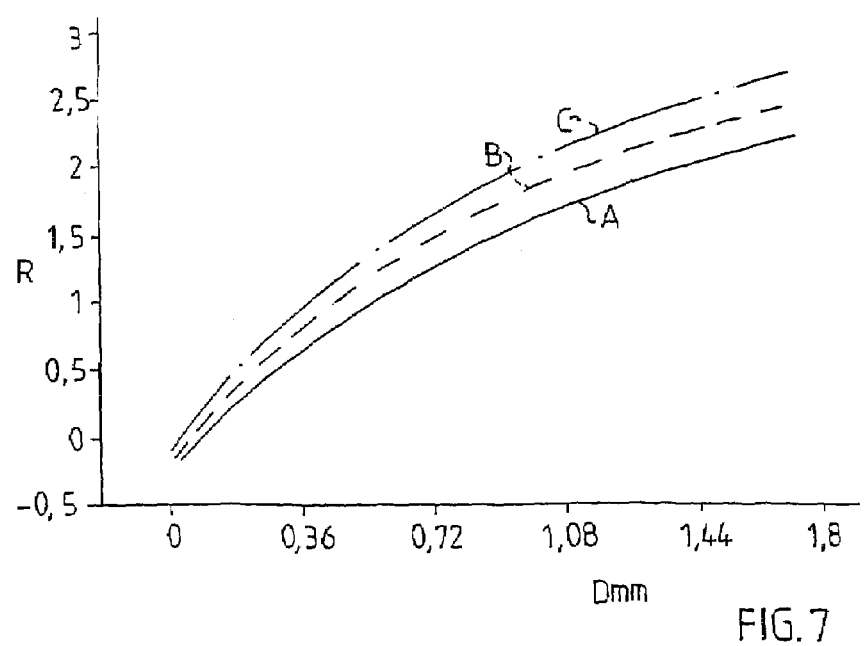
FIG. 7 shows a graph corresponding to FIG. 6, but in respect of a transducer realization according to the prior art.

FIGS. 6 and 7 illustrate in the form of graphs the relationship between the size D (the horizontal axis) of the beating gap 6 and the size of an output signal R (the vertical axis) read off on a measuring apparatus, at different degrees of wearing of the measuring head 14. FIG. 6 shows the result with a solution according to the invention and FIG. 7 shows the result with a solution according to the prior art in which the holder 16 is on a level with the end of the casing 17 and in which the casing 17 is therefore worn together with the holder 16. In both figures, the curves A, B and C relate to a wear amounting to zero, 0.5 and 1 mm respectively.

As can be seen, according to FIG. 6, with a solution according to the invention, a smaller spread of the measurement results is obtained than, according to FIG. 7, with the old solution. With the solution according to the invention, a smaller spread in respect of small distances D is especially obtained, something which is advantageous from the precision viewpoint.

A plausible explanation for the surprisingly good result with a solution according to the invention is that, in the event of wear and tear on the transducer, the electromagnetic flows are impacted less when the casing 17 remains intact in a solution according to the invention than when it is worn away in length in a previously used solution and that the measurement results, in the event of wear and tear on the transducer, are consequently more stable in a solution according to the invention.

The invention claimed is:

1. Transducer for distance measurement, between a stator and a rotor in a refiner for paper pulp production, in which the transducer is of the magnetic type and has a tubular casing (17) at one end of which a measuring pole (15) interacting with measuring windings (19–21) inside the casing is fixed by means of a holder (16) of non-magnetic material which seals the end of the casing, characterized in that the holder (16), with a first portion (22) of its axial length, reaches axially beyond the end of the casing (17), that this first portion (22) of the holder connects to the end of the casing (17) and at least partially covers said end, and in that this first portion (22) and the measuring pole (15) are intended to be able to be worn away to a smaller axial length during use of the transducer, whilst the length of the casing is maintained.

2. Transducer according to claim 1, characterized in that the holder at least at the end of the casing, has a diameter essentially corresponding to the outer diameter of the casing.

3. Transducer according to claim 2, characterized in that the first portion (22) of the holder, along the whole of its length, has the same external form as the casing (17).

4. Transducer for distance measurement, between a stator and a rotor in a refiner for paper pulp production, in which the transducer is of the magnetic type and has a tubular casing (17) at one end of which a measuring pole (15) interacting with measuring windings (19–21) inside the casing is fixed by means of a holder (16) of non-magnetic material which seals the end of the casing, characterized in that the holder (16), with a first portion (22) of its axial length, reaches axially beyond the end of the casing (17), that this first portion (22) of the holder connects to the end of the casing (17) and at least partially covers said end, and in that this first portion (22) and the measuring pole (15) are intended to be able to be worn away to a smaller axial length during use of the transducer, whilst the length of the casing is maintained, and characterized in that the holder (16), with a second portion (23) of its axial length, extends into the casing, this second portion having a diameter essentially corresponding to the inner diameter of the casing.

5. Transducer for distance measurement, between a stator and a rotor in a refiner for paper pulp production, in which the transducer is of the magnetic type and has a tubular casing (17) at one end of which a measuring pole (15) interacting with measuring windings (19–21) inside the casing is fixed by means of a holder (16) of non-magnetic material which seals the end of the casing, characterized in that the holder (16), with a first portion (22) of its axial length, reaches axially beyond the end of the casing (17), that this first portion (22) of the holder connects to the end of the casing (17) and at least partially covers said end, and in that this first portion (22) and the measuring pole (15) are intended to be able to be worn away to a smaller axial length during use of the transducer, whilst the length of the casing is maintained, and characterized in that the holder (16) and the casing (17) are mutually connected by means of a joint (24) disposed around the outside of the transducer, wherein the joint is a weld joint.

6. Transducer according to claim 5, characterized in that on each side of the joint (24) there is disposed a circumferential groove (25, 26), one groove (25) being disposed in the holder (16) and one groove (26) being disposed in the casing (17).

7. Transducer according to claim 2, characterized in that the holder (16), with a second portion (23) of its axial length, extends into the casing, this second portion having a diameter essentially corresponding to the inner diameter of the casing.

8. Transducer according to claim 3, characterized in that the holder (16), with a second portion (23) of its axial length, extends into the casing, this second portion having a diameter essentially corresponding to the inner diameter of the casing.

9. Transducer according to claim 4, characterized in that the holder at least at the end of the casing, has a diameter essentially corresponding to the outer diameter of the casing.

10. Transducer according to claim 5, characterized in that the holder at least at the end of the casing, has a diameter essentially corresponding to the outer diameter of the casing.

11. Transducer according to claim 1, wherein, the one end of the tubular casing (17), during use, is not exposed to any wear.

* * * * *